United States Patent Office 2,704,729
Patented Mar. 22, 1955

2,704,729

FELTING RESISTANT TREATMENT FOR WOOLEN MATERIALS

Charles A. Fetscher, Troy, N. Y., assignor to Cluett, Peabody & Co., Inc., Troy, N. Y., a corporation of New York No Drawing. Application March 1, 1952,
Serial No. 274,495

11 Claims. (Cl. 117—76)

This invention concerns a method of treating woolen materials, in yarn or fabric form, to make them resistant to the felting caused by laundering. It is applicable to textile materials which have a sufficient woolen content to suffer dimensional change in laundering because of the felting peculiar to wool. It is estimated that a textile material with as little as about 25% wool would show shrinkage occasioned by the felting of the wool and could be improved by the treatment according to this invention.

It has been found that it is sometimes possible to render a woolen fabric quite shrink resistant by treatment with a rubber or a rubber-like resin. The term rubber is intended to include the so-called synthetic rubbers or rubber substitutes. The added material probably acts to mask the scales and minimize the unidirectional migration of the fibers, or to cement the fibers together and prevent migration entirely, or to give both effects to some degree.

The choice of the proper rubber or resin has been the problem. Experimentation has shown that the high molecular weight homopolymers of butadiene are most dependable in controlling the tendency to shrink. It is not understood why this is so, but it is believed that the high residual unsaturation in the polymeric molecules cause them to adhere very strongly to the wool fibers and permanently alter the tendency to felt. However, this high residual unsaturation is a serious drawback since such material tends to stiffen with age due to oxidation and the continuing formation of cross links. Hence fabric treated with such a material becomes stiff and boardy and very unwool-like in character after a short time.

Naturally then, non-aging rubber would appear to be desirable. The butadiene acrylonitrile copolymer rubbers are the best in resisting change with age. In my experience these butadiene acrylonitrile copolymers do not dependably give shrinkage control. I suspect that they do not have intrinsic tack necessary for them to stick to the woolen fibers and control the behavior of the fibers during several launderings. Whatever the reason, the acrylonitrile rubbers at present available cannot be depended upon to give adequate launderability to the woolen material. On the other hand wool treated with five or six percent of one of these acrylonitrile copolymers shows excellent aging characteristics, in most instances, no change at all being detectable with age.

I have found that a mere mixture of the two types, the butadiene polymer and the butadiene acrylonitrile copolymer is especially good. The two types of synthetic rubber or rubber substitutes show unexpected complementary action in modifying the wool and together give a completely satisfactory result where neither type is adequate by itself.

Thus a given woven woolen fabric, when treated with the different rubber emulsions separately and in mixtures, dried and then given five wool washes indicated shrinkages and aging characteristics as follows:

|  | Felting Shrinkage | | Change With Age |
|---|---|---|---|
|  | Warp | Filling |  |
|  | Percent | Percent |  |
| Untreated fabric | 33.0 | 27 | No Change. |
| Fabric treated with 1% by weight butadiene polymer rubber | 22.2 | 15.5 | Do. |
| Fabric treated with 3% by weight butadiene polymer rubber | 7.5 | 6.3 | Questionable. |
| Fabric treated with 5% by weight butadiene polymer rubber | 0.3 | 0.0 | Very boardy. |
| Fabric treated with 3% by weight butadiene acrylonitrile copolymer rubber | 32 | 27 | No Change. |
| Fabric treated with 5% by weight butadiene acrylonitrile copolymer rubber | 27 | 21 | Do. |
| Fabric treated with 7% by weight butadiene acrylonitrile copolymer rubber | 12.4 | 10.3 | Do. |
| Fabric treated with 1% butadiene polymer rubber and 4% butadiene acrylonitrile copolymer rubber | 2.1 | 0.7 | Do. |

An inspection of the results shows that the effect of the combination is considerably more than merely additive. 4% of the butadiene acrylonitrile copolymer rubber which is essentially useless by itself for the treatment of this fabric, is sufficient to make less than half enough of the polybutadiene rubber satisfactory. Thus 4% butadiene acrylonitrile copolymer rubber which would reduce the shrinkage by less than 10%, and 1% polybutadiene which reduced the shrinkage by 11%, together reduce the shrinkage of this fabric by 31%.

It is surprising that two types of rubber must be present as separate entities. A copolymer of acrylonitrile and butadiene in exactly the same proportions as present in a completely satisfactory mixture of polybutadiene and butadiene acrylonitrile copolymer, is useless.

Thus, a sample of low end wool flannel which showed felting shrinkage of 43% warpwise and 32% in the filling direction after three recognized wool washes (Army Quartermaster #MIL-C-10752) was used for the following tests.

Samples of the fabric were saturated with the following four treating emulsions (one sample saturated with one emulsion) adjusted in solids to give a final 6% rubber on the wool.

1. A mixture of 2 parts butadiene acrylonitrile copolymer (33% acrylonitrile) and 1 part polybutadiene.
2. A heteropolymer of total composition above. 28% acrylonitrile and 72% butadiene.
3. A mixture of 4 parts butadiene acrylonitrile copolymer (33% acrylonitrile) and 1 part polybutadiene.
4. A heteropolymer of the same composition as mixture #3. 30.8% acrylonitrile and 69.2% butadiene.

After three wool washes the four samples showed felting shrinkage as follows:

|  | Warp | Filling |
|---|---|---|
|  | Percent | Percent |
| #1 | 1.7 | 0.0 |
| #2 | 9.8 | 6.5 |
| #3 | 2.3 | 1.2 |
| #4 | 12.7 | 11.9 |

The mixture then of the polymer and copolymer is far better than a copolymer of a composition corresponding to the over-all composition of the mixture.

My invention comprises the use of a mixture of two latices. The first component is an aqueous emulsion of a high molecular weight homopolymer of butadiene. Such a material is commercially available under the trade named of "Dur Lana" as a 25% solids anionic emulsion and prepared as described in one or more of the following U. S. Patents: 2,447,538; 2,447,539; 2,447,540; 2,447,772 and 2,447,876.

The second component is an aqueous emulsion of a copolymer of acrylonitrile and butadiene and may, I have found contain a minor portion, about 5% to 10%, of a third monoolefinic vinyl monomer such as ethyl acrylate, styrene, and methyl methacrylate. The use of such a terpolymer offers little or no advantage over the simple butadiene acrylonitrile copolymer which I am about to describe more fully, but I wash to emphasize that minor modification of the copolymer by the utilization of a small amount of a third monomer does not change the operability of the material and should not be considered a departure from the spirit of this discovery. The copolymer should correspond to from about 20% to 40% acrylonitrile and the remainder essentially butadiene. The copolymer should be of essentially 100% polymerization and show a Mooney viscosity of 20 to 50 M. S. (measured with the small, 1.2", rotor). There are many commercially available butadiene acrylonitrile rubbers which are satisfactory as one component of the mixed latex which I have found to be useful. The "Hycar O. R." latices are prepared as described in U. S. Patent No. 2,380,473. The "Chemigum" latices are similar operable butadiene acrylonitrile rubbers. Two of these, for example, which are satisfactory are:

"Chemigum Latex 200"—an anionic emulsion of a butadiene acrylonitrile copolymer of monomer ratio 70:30. It can also be identified as a rubber latex resulting from the polymerization of a mixture comprising 70 parts of butadiene and 30 parts of acrylonitrile polymerized in accordance with techniques well known in the synthetic rubber industry and as disclosed particularly in U. S. 1,973,000.

"Chemigum Latex 245B"—an anionic emulsion of a butadiene acrylonitrile copolymer, with butadiene and acrylonitrile in the ratio of 67:33.

These are also anionic emulsions and completely miscible with a polybutadiene emulsion described above.

The latices or rubber emulsions should be mixed in the ratio of one part butadiene polymer to from one to five parts of the butadiene acrylonitrile copolymer. I prefer to use one part polymer to from two to four parts copolymer.

The solid particles of the rubber emulsions should not be strongly attracted to the wool materials or fabric because if they were, the bath concentration would change and uniform treatment would be very difficult to realize. Therefore, anionic or nonionic emulsions are to be preferred. The wool is treated as it is found, without any preconditioning being essential. Normally wool will be above its isoelectric point and negatively charged. Preferably the wool should be above its isoelectric point for ease of control, but one could obtain usable results with acid wool, or with wool below its isoelectric point, by exercising careful control.

The wool material, whether in fabric or yarn form, is saturated or impregnated with the emulsion mixture in any suitable manner, such as by spraying the emulsion mixture upon the material, or by dipping the material in the emulsion mixture. The excess emulsion or bath is removed or expressed such as by squeezing to leave in or on the material a predetermined quantity of the emulsion mixture. This quantity, called the pick up, will vary with the type of fabric or material and the pressure used in squeezing out the excess. The concentration of the saturating emulsion mixture is therefore first adjusted to the degree indicated by the pick up to give the desired rubber solids on the wool material. Thus, for example, if 6% rubber solids are desired on the wool material, and the pick up is found to be 100%, a 6% emulsion will be used. The amount of rubber solids to be added to the wool material will vary from a minimum of about 2% to a maximum of about 8%. If less than about 2 rubber solids are added, adequate resistance to felting may not be obtained, and if more than 8% rubber solids are added, the hand of the wool material may be too stiff, rubbery and objectionable.

After the wool material has been impregnated or saturated with the emulsion mixture, and excess mixture removed, the wool material is dried in any suitable manner, after which it may be given any normal finishing treatment.

The term "emulsion" is intended to mean aqueous emulsions or dispersions of rubber solids. The word butadiene is used in its commonly accepted meaning, i. e. to be equivalent to the expression butadiene 1.3 hydrocarbon.

I claim:

1. The method of treating woolen materials to render them resistant to felting caused by laundering, which comprises impregnating said materials with a mixture of aqueous emulsions, present as separate entities one of which is of a high molecular weight homopolymer of butadiene, and the other of which is of a copolymer of acrylonitrile and butadiene containing from about 20% to 40% acrylonitrile, then eliminating excess mixture from said impregnated materials to leave thereon a desired pick up of emulsions which will give from about 2% to 8% of rubber solids on said materials, and then drying the impregnated materials.

2. A method of treating woolen materials to render them resistant to felting caused by laundering, which comprises impregnating said materials with a mixture of aqueous emulsions, present as separate entities one of which is of a high molecular weight, homopolymer of butadiene, and the other of which is of a copolymer of acrylonitrile, butadiene and a minor portion of a third vinyl monomer, the copolymer containing from about 20% to 40% acrylonitrile eliminating excess mixture to leave a pick up on said materials of between about 2% to 8% rubber solids, and then drying the impregnated materials.

3. A method of treating woolen materials to render them resistant to felting caused by laundering, which comprises impregnating said materials with a mixture of aqueous emulsions, present as separate entities one of which is of a high molecular weight, homopolymer of butadiene, and the other of which is of a copolymer of acrylonitrile and butadiene containing from about 20% to 40% acrylonitrile and the remainder essentially butadiene, eliminating excess mixture to leave a pick up on said materials of between about 2% to 8% rubber solids, and then drying the impregnated materials.

4. A method of treating woolen materials to render them resistant to felting caused by laundering, which comprises impregnating said materials with a mixture of aqueous emulsions, present as separate entities one of which is of a high molecular weight, homopolymer of butadiene, and the other of which is of a copolymer of acrylonitrile and butadiene the mixture having the ratio of about one part butadiene polymer to from one to five parts of the butadiene acrylonitrile copolymer, eliminating excess mixture to leave a pick up on said materials of between about 2% to 8% rubber solids, and then drying the impregnated materials.

5. A method of treating woolen materials to render them resistant to felting caused by laundering, which comprises impregnating said materials with a mixture of anionic aqueous emulsions, present as separate entities one of which is of a high molecular weight, homopolymer of butadiene, and the other of which is of a copolymer of acrylonitrile, butadiene and a minor portion of a third vinyl monomer such copolymer containing from about 20% to 40% acrylonitrile, eliminating excess mixture to leave a pick up on said materials of between about 2% to 8% rubber solids, and then drying the impregnated materials.

6. A method of treating woolen materials to render them resistant to felting caused by laundering, which comprises impregnating said materials with a mixture of aqueous anionic emulsions, present as separate entities one of which is of a high molecular weight, homopolymer of butadiene, and the other of which is of a copolymer of acrylonitrile, butadiene and a minor portion of a third vinyl monomer replacing a portion of the butadiene, about 20% to 40% of which is acrylonitrile and the balance butadiene and the third monomer, eliminating excess mixture to leave a pick up on said materials of between about 2% to 8% rubber solids, and then drying the impregnated materials.

7. A method of treating woolen materials to render them resistant to felting caused by laundering, which comprises impregnating said materials with a mixture of aqueous anionic emulsions, present as separate entities one of which is of a high molecular weight, homopolymer of butadiene, and the other of which is of a copolymer of acrylonitrile and butadiene of essentially about 100% polymerization, such copolymer containing from about 20% to 40% acrylonitrile the mixture having the ratio of about one part butadiene polymer to from one to five parts of the butadiene acrylonitrile copolymer, eliminating excess mixture to leave a pick up on said materials of between about 2% to 8% rubber solids, and then drying the impregnated materials.

8. A method of treating woolen materials to render them resistant to felting caused by laundering, which comprises impregnating said materials with a mixture of aqueous emulsions, present as separate entities one of which is of a high molecular weight, homopolymer of butadiene, and the other of which is of a copolymer of acrylonitrile and butadiene containing from about 20% to 40% acrylonitrile and the remainder essentially butadiene, with essentially about 100% polymerization and showing a Mooney viscosity of 20 to 50 M. S. eliminating excess mixture to leave a pick up on said materials of between about 2% to 8% rubber solids, and then drying the impregnated materials.

9. The method of treating woolen materials to render them resistant to felting caused by laundering, which comprises impregnating said materials with a mixture of aqueous emulsions, present as separate entities one of which is of a high molecular weight homopolymer of butadiene, and the other of which is of a copolymer of acrylonitrile and butadiene, essentially of about 100% polymerization and having about 20% to 40% acrylonitrile and balance essentially butadiene, then eliminating excess mixture from said impregnated materials to leave thereon a desired pick up of emulsions which will give from about 2% to 8% rubber solids on said materials, and then drying the impregnated materials.

10. A method of treating woolen materials to render them resistant to felting caused by laundering, which comprises impregnating said materials with a mixture of aqueous emulsions, present as separate entities one of which is of a high molecular weight, homopolymer of butadiene, and the other of which is of a copolymer of acrylonitrile and butadiene containing from about 20% to 40% acrylonitrile the mixture having the ratio of about one part butadiene polymer to from one to five parts of the butadiene acrylonitrile copolymer, eliminating excess mixture from said impregnated materials to leave thereon a desired pick up of emulsions which will give from about 2% to 8% rubber solids on said materials, and then drying the impregnated materials.

11. The method of treating woolen materials to render them resistant to felting caused by laundering, which comprises impregnating said materials with a mixture of aqueous emulsions, present as separate entities one of which is of a high molecular weight homopolymer of butadiene, and the other of which is of a copolymer of acrylonitrile and butadiene containing from about 20% to 40% acrylonitrile, eliminating excess mixture from said impregnated materials to leave thereon a desired pick up of emulsions which will give from about 2% to 8% rubber solids on said materials, and then drying the impregnated materials.

References Cited in the file of this patent

UNITED STATES PATENTS

| | | |
|---|---|---|
| 2,270,285 | Frolich | Jan. 20, 1942 |
| 2,447,539 | Rust | Aug. 24, 1948 |
| 2,447,876 | Rust | Aug. 24, 1948 |
| 2,585,583 | Pinkney | Feb. 12, 1952 |